United States Patent
Lakshman et al.

(10) Patent No.: US 9,239,713 B1
(45) Date of Patent: Jan. 19, 2016

(54) PLATFORM INDEPENDENT RENDERING FOR NATIVE MOBILE APPLICATIONS

(71) Applicants: TK Lakshman, San Carlos, CA (US); Jagadish Bandhole, Saratoga, CA (US); Bill Blume, San Jose, CA (US); Sekaran Nanja, San Jose, CA (US)

(72) Inventors: TK Lakshman, San Carlos, CA (US); Jagadish Bandhole, Saratoga, CA (US); Bill Blume, San Jose, CA (US); Sekaran Nanja, San Jose, CA (US)

(73) Assignee: MobileForce Software, Inc., Sunnyvale, CA (US)

( * ) Notice: Subject to any disclaimer, the term of this patent is extended or adjusted under 35 U.S.C. 154(b) by 0 days.

(21) Appl. No.: 14/198,567

(22) Filed: Mar. 5, 2014

Related U.S. Application Data (60) Provisional application No. 61/773,775, filed on Mar. 6, 2013.

(51) Int. Cl.
| G06F 9/45 | (2006.01) |
| G06F 9/455 | (2006.01) |
| G06F 9/445 | (2006.01) |
| H04W 4/00 | (2009.01) |

(52) U.S. Cl.
CPC ... G06F 8/60 (2013.01); G06F 8/41 (2013.01); H04W 4/001 (2013.01)

(58) Field of Classification Search
CPC .............. G06F 8/41; G06F 8/60; G06F 8/71; G06F 8/443; G06F 8/447; H04W 4/001
USPC .................................................. 717/151, 178
See application file for complete search history.

(56) References Cited

U.S. PATENT DOCUMENTS

| 8,910,115 | B2 * | 12/2014 | Reddy et al. | 717/106 |
| 2006/0129972 | A1 * | 6/2006 | Tyburski et al. | 717/106 |
| 2009/0313004 | A1 * | 12/2009 | Levi et al. | 703/28 |
| 2011/0154305 | A1 * | 6/2011 | LeRoux et al. | 717/140 |
| 2011/0161912 | A1 * | 6/2011 | Eteminan et al. | 717/101 |
| 2011/0209128 | A1 * | 8/2011 | Nikara et al. | 717/140 |
| 2011/0258595 | A1 * | 10/2011 | Clevenger | 717/106 |
| 2012/0089733 | A1 * | 4/2012 | Luh et al. | 709/225 |
| 2012/0144384 | A1 * | 6/2012 | Baek | 717/173 |
| 2014/0372518 | A1 * | 12/2014 | Moore et al. | 709/203 |

* cited by examiner

*Primary Examiner* — Ryan Coyer
(74) *Attorney, Agent, or Firm* — Carr & Ferrell LLP (57) ABSTRACT

A method for rendering native mobile applications is disclosed. The method includes maintaining, by a computing device with one or more processors and a memory, a mobile application specification, a plurality of plug-in specifications, each of the plug-in specifications being associated with at least one first enterprise backend resource or enterprise service, and a plurality of widget specifications, each of the widget specifications being associated with at least one second enterprise backend resource or enterprise service. The method selectively integrates at least one of the plug-in specifications or at least one of the widget specifications into the mobile application specification. The method further compiles one or more native mobile applications based at least in part on the mobile application specification, and sends the one or more native mobile applications to one or more client devices.

18 Claims, 6 Drawing Sheets

PLATFORM INDEPENDENT RENDERING FOR NATIVE MOBILE APPLICATIONS

CROSS-REFERENCE TO RELATED APPLICATIONS

This application claims benefit of U.S. Provisional Patent Application Ser. No. 61/773,775, filed on Mar. 6, 2013, entitled "Bidirectional Interaction with Cloud Enterprise Backend Systems Using Composable Plug-Ins and Platform Independent Client Native Rendering for Native Mobile Apps," which is incorporated herein by reference in its entirety for all purposes.

TECHNICAL FIELD

This disclosure relates generally to data processing and, more specifically, to platform-independent rendering for native mobile applications.

BACKGROUND

The approaches described in this section could be pursued but are not necessarily approaches that have been previously conceived or pursued. Therefore, unless otherwise indicated herein, the approaches described in this section are not prior art to the claims in this application and are not admitted to be prior art by inclusion in this section.

Portable handheld devices such as smartphones, tablet computers, and other mobile devices are widely used around the world. Many individuals own mobile devices and use them for a variety of purposes. These mobile devices can enable both cellular and Wi-Fi® communication and, accordingly, provide users with the ability to access content almost instantly. In particular, these mobile devices can run application software, also known as "mobile applications," "mobile apps," or simply "apps," facilitate user access to various functionalities of these mobile devices or content stored on the mobile devices or on a remote server.

Mobile applications have been conventionally utilized for general productivity and information retrieval such as e-mail, calendar, contacts, and weather information. However, public demand and the availability of developer tools have driven rapid expansion into other categories such as mobile games, navigation and location-based services, banking, order-tracking, fitness related monitoring and tracking, ticket purchases, and so forth. Mobile applications typically are available through application distribution platforms, such as Apple App Store®, Google Play®, Windows Phone Store®, and Blackberry App World®, which are specific to corresponding mobile devices such as an iPhone®, Android® phone, Windows Phone®, and Blackberry®.

The diversity of these devices presents a considerable challenge to those who want to develop content for as wide an audience as possible because mobile devices can run different operating systems (OS); this requires different versions of mobile application to be written for each OS. In other words, software developers need to create hardware/OS platform specific mobile applications for each type of mobile device. For example, one should use Objective C language to create an application for iOS® devices (e.g., iPhone®), Java® to create an application for Android® devices, and .NET® language for Windows® phones.

Traditionally, mobile applications are enterprise oriented, meaning that a mobile application is tied to specific backend resources and services of an enterprise. For example, a mobile application for purchasing movie tickets uses web and cloud resources, and service employed and controlled by a specific enterprise. This approach can significantly limit the utility of mobile applications as well as limit the ability of developers or vendors of the mobile applications to customize the mobile applications for various enterprise needs.

In addition, it can be prohibitively costly for a small enterprise to develop and maintain necessary backend services in order to compete with bigger enterprises. Additionally, enterprise mobile applications can be vulnerable to hacking or illegal data access due to inadequate security. In many instances, enterprise mobile applications are not protected by conventional enterprise security solutions.

Thus, enterprise mobile applications can be of limited use while their development is costly and time consuming. Furthermore, enterprise mobile applications are typically not able to share data with various cloud-based services or resources.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present technology provides for automatic rendering of native mobile applications for mobile devices of different hardware/OS platforms based on a single mobile application specification, which can also integrate various plug-in and widget specifications. The technology provides a server-based platform independent from declarative mobile application languages. The platform enables enterprise users to create mobile application specifications and integrate plug-ins or widgets into the mobile application specifications. The platform can automatically generate native mobile applications based on the mobile application specification and selected plug-in and/or widget specifications. The plug-in and widget specifications enable native mobile applications to take advantage and utilize different enterprise backend resources/services, other proprietary web resources/services, and/or public web resources/services, in order to provide data sharing therebetween and enhance native mobile application productivity and functionality.

The present technology further enables implementing native mobile applications on client devices such that they can read or address the mobile application and plug-in/widget specifications at run time and provide corresponding graphical user interfaces (GUIs) and workflows, which are unified across all mobile OS platforms. In addition, the present technology provides an administration interface for enterprise users to administer and manage not only mobile application specifications, but also native mobile applications on the client side, enable communication between distinct clients, and to track and analyze mobile application usage, plug-in usage, widget usage, and so forth.

According to one example embodiment of the present disclosure, there is provided a method for rendering native mobile applications. The method is implemented by a computing device comprising one or more processors, one or more memories, and one or more communication interfaces. One example of the computing device includes a server and another example includes a distributed computing architecture involving multiple interconnected computing devices, such as servers, also known as "cloud computing." The method includes maintaining a mobile application specification, maintaining a plurality of plug-in specifications, and maintaining a plurality of widget specifications. Each of the plug-in specifications is associated with at least one first enterprise backend resource or enterprise service. Similarly, each of the widget specifications is associated with at least one second enterprise backend resource or enterprise service. The method further includes selectively integrating at least one of the plug-in specifications and/or at least one of the widget specifications into the mobile application specification. The method further comprises compiling one or more native mobile applications based at least in part on the mobile application specification and sending the one or more native mobile applications to one or more client devices, and enabling the native mobile applications to communicate with each other.

In certain embodiments, the method further comprises the computing device providing a web interface console and enabling one or more enterprise users to create a mobile application specification. The method may further comprise enabling an enterprise user, by means of the computing device and a web interface console, to select at least one of the plug-in specifications for integration into the mobile specification. Similarly, in certain embodiments, the method further comprises enabling an enterprise user, by means of the computing device and a web interface console, to select at least one of the widget specifications for integration into the mobile specification. In various example embodiments, the native mobile applications are independent from an operating system of the one or more client devices.

According to yet further embodiments, compiling of the one or more native mobile applications comprises compiling a first native mobile application based at least in part on the mobile application specification, and compiling a second native mobile application based at least in part on the mobile application specification, wherein the second native mobile application differs from the first native mobile application and yet, can communicate with the first.

According to yet further embodiments, the sending of the one or more native mobile applications to the one or more client devices comprises sending the first native mobile application to a first client device, wherein the first native mobile application is specific to an operating system or hardware associated with the first client device, and the first native mobile application capable of being executed by the first client device; and sending the second native mobile application to a second client device, wherein the second native mobile application is specific to an operating system or hardware of the second client device and the second native mobile application is capable of being executed by the second client device. In these examples, the first client device comprises a first operational software platform, the second client device comprises a second operational software platform, and the first operational software platform differs from the first operational software platform.

According to yet further example embodiments, the first native mobile application is configured to provide a unified GUI for displaying by the first client device with the second native mobile application being configured to provide the unified GUI for displaying by the second client device. At least one of the widget specifications or at least one of the plug-in specifications may be configured to enable bi-directional data transmissions between the one or more native mobile applications and at least one of the following: the at least one first enterprise backend resource or enterprise service and the at least one second enterprise backend resource or enterprise service.

According to yet further example embodiments, the method further comprises providing a management interface for enterprise users. The management interface can be configured to enable the enterprise users to manage workflows of the one or more native mobile applications. The management interface can be configured to enable the enterprise users to manage a lifecycle of the one or more native mobile applications. The management interface can be configured to track and monitor usage of the one or more native mobile applications. The management interface can be configured to track and monitor usage of at least one the following: the at least one first enterprise backend resource or enterprise service and the at least one second enterprise backend resource or enterprise service. The management interface can be configured to track and monitor usage of at least one the following: an enterprise backend plug-in component maintained by the computing device and an enterprise backend widget component maintained by the computing device.

In further example embodiments, steps of method(s) described herein may be stored on a computer readable storage medium having a program embodied thereon, with the program executable by a processor in a computing device. In yet further exemplary embodiments, modules, systems, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

As outlined above, embodiments of the present disclosure include systems and methods for rendering native mobile applications for various types of client devices running different OSs and/or having different hardware components and functionalities. The term "client device," as used in the present disclosure, refers to a wide range of portable computing devices such as cellular telephones, smartphones, tablet computers, laptop computers, personal digital assistants (PDAs), music players, and so forth. Some examples of client devices include an iPhone®, Android® phone, Windows Phone®, and BlackBerry®.

The rendering of native mobile applications for different client devices is based on a mobile application specification (i.e., a unified language that can be created by enterprise users, for example, through a web platform). The platform enables its users to rapidly specify, rather than code, mobile application specifications stipulating mobile application GUIs, screens, data, overall functionality, integration, communication with hardware components and web services, and so forth. The enterprise users may easily select various plug-ins or widgets and integrate them into mobile application specifications and native mobile applications to provide functionalities of backend enterprise resources or services or any other public or proprietary web resources or services (including cloud-based resources or services). The platform has a graphical console for non-professional developers to easily construct mobile application specifications. The platform also employs an engine or synthesizer, which is configured to convert the mobile application specification into a code for one or more native mobile applications.

Once rendered, the native mobile applications can be further deployed across various client devices having different OS platforms, hardware, and functionalities. Notably, all native mobile applications created based on a single mobile application specification integrating various plug-in or widget specifications provide substantially the same graphical interface and functionalities regardless of hardware or OS platform of the client devices.

The platform also enables automating the entire native mobile application lifecycle including packaging native mobile applications, and their delivery, deployment, hosting, use, management, access-control, update, and upgrade, as well as usage tracking and analytics. In certain embodiments, the platform also includes a management interface configured to track, manage, and analyze the usage of native mobile applications, plug-ins, and widgets used, the usage of backend resources or services, and so forth.

Accordingly, the embodiments of the present disclosure provide systems and methods for rendering native mobile applications that seamlessly integrate public or proprietary plug-ins or widgets to enable rapid and secure access to different backend systems directly from client devices. In this regard, a single native mobile application installed on a client device provides bi-directional access to different enterprise backend resources or services, public resources or services, cloud-based or web resources or services, and so forth. Notably, the creation of such a native mobile application becomes a simple process available even to non-professional software developers. The mobile application specification needed for rendering a native mobile application can be created through a web platform to enable its users to select and specify native mobile application elements including, for example, screens, content, applets, controls, plug-ins, widgets, operation rules, and so forth.

Another important feature of the present technology is sharing data or content associated with native mobile applications between distinct enterprise backend resources or services. In yet further embodiments, the functionality of native mobile applications may include integration and interaction of distinct enterprise backend resources or services through the platform based on the mobile application specification.

In yet further embodiments, the present technology provides for improvement of security of data storage and transmission between the native mobile applications and distinct enterprise backend resources or services. To these ends, the technology seamlessly utilizes security containers. More specifically, the native mobile applications are secured within enterprise grade secure containers. In further example embodiments, existing enterprise single-sign-on mechanisms (if any) can be used in conjunction with a role based access control to provide enterprise grade secure access to enterprise backend systems from multiple native mobile applications.

These and other embodiments of the present disclosure are now described with reference to the figures of drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures, systems and devices are shown in block diagram form in order to facilitate describing one or more embodiments.

Figure 1:
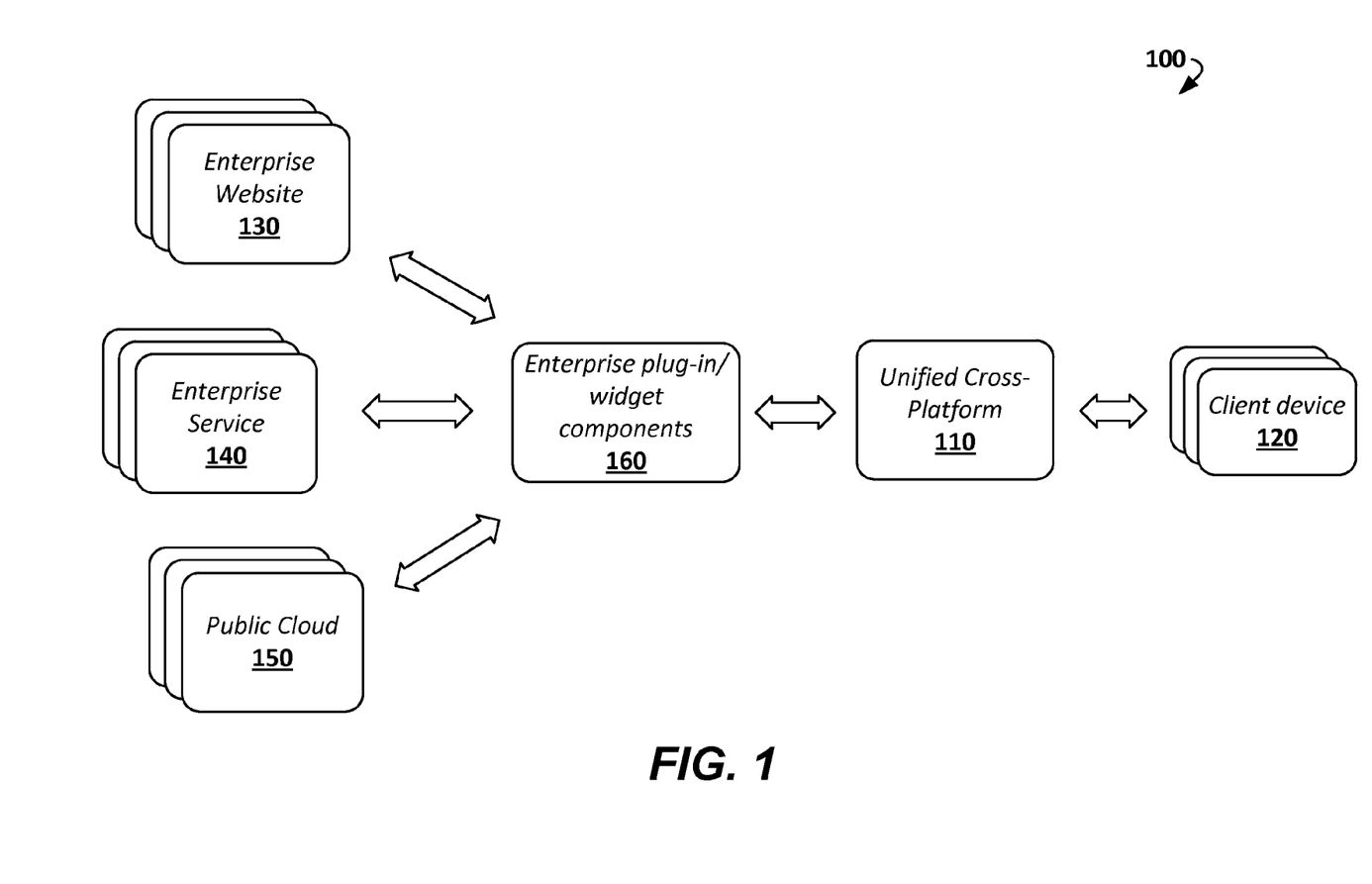
FIG. 1 shows a high-level block diagram illustrating a system environment suitable for implementing methods for platform-independent rendering of native mobile applications.

FIG. 1 shows a high-level system environment 100 suitable for implementing methods for rendering native mobile applications, according to an example embodiment of the present disclosure. The environment 100 includes a unified cross-platform 110 (hereinafter referred to as a "platform"), which enables, among other things, enterprise users to create and maintain mobile application specifications, plug-in specifications, and widget specifications. The platform 110 is also configured to render native mobile applications based upon these specifications and enable secure interactions between not only native mobile applications and various backend systems associated with the plugin-in and widget specifications, but also between distinct backend systems.

The platform 110 may be an integral part of a server, which may optionally provide cloud mobile services. In general, mobile cloud services are a discrete set of high-value middleware capabilities designed to be consumed by mobile applications. Mobile cloud services complement the platform and help accelerate and enrich mobile application development. The mobile cloud services may also provide platform-agnostic mobile application development and easy developing on-ramp via software development kits (SDKs).

In certain embodiments, the platform 110 is a standards compliant open platform including, for example, REST web-services, Application Programming Interfaces (APIs) enabling integration features, extensible plug-ins or widgets for rapid mobile application development, and a personalization engine for delivering specific content and native mobile applications to selected client devices 120 based on predetermined rules and criteria. Accordingly, the platform 110 communicates with one or more client devices 120 and a number of public and proprietary web resources and services 130-150 via one or more communication networks. As discussed above, the client devices 120 include, for example, smartphones or tablet computers which may install and run native mobile applications such as native mobile applications synthesized by the platform 110.

The platform 110 may also communicate with one or more enterprise plug-in or widget components 160. These components may include software, middleware, applets, or any other virtual modules enabling implementation of dedicated customizable functionalities such as the addition of specific features to existing native mobile applications, thereby enhancing them with new operations, abilities, extensions, and so forth. Plug-in components may include add-ons, snap-ins, themes, or other extensions needed for tailoring of the core features of native mobile applications. Widget components may include transient or auxiliary applications extending functionalities of native mobile applications, and providing new GUIs, screens, content, or new ways of interaction. The enterprise plug-in or widget components 160 can be powered by resources or services provided by elements 130-150.

In certain embodiments, and as shown in FIG. 1, one or more enterprise websites 130 can bear specific content, data or functionalities. The term "enterprise" is used herein to designate that the web services and content to be delivered to the client devices 120 is private and may possess commercial purposes. Similarly, the platform 110 may also communicate with one or more enterprise services 140 such as web services including REST-compliant web services enabling manipulation of XML (Extensible Markup Language) representations to the client devices 120 or arbitrary web services exposing arbitrary operations or processes. The platform 110 may also communicate with one or more public clouds 150 implementing a "cloud computing" model for online services or resources, such as public storage of content or software applications, available to the general public.

Accordingly, the platform 110 enables data transmission and processing across multiple mobile applications using cloud computing technology in order to minimize the number of tools needed for mobile application developers or owners. The platform 110 enables its users to create, host, deliver, and personalize native mobile applications independent of hardware or OS of target client devices 120, as well as support content transactions and monitoring of mobile application activities.

As outlined above, the platform 110 enables enterprise users to create mobile application specifications. For these ends, there is no need for the users to write mobile applications specifications using a programming language. Instead, the enterprise users may use a graphical console of the platform 110 to design and create mobile application specifications, which can be further synthesized "on-the-fly" into selected native mobile applications and delivered to the client devices 120. An important feature of the platform 110 and its graphical console is that the enterprise users can select plug-ins or widgets and integrate them into native mobile applications. The integration may be as simple as integration of corresponding plug-in specifications or components and/or widget specifications or components into the mobile application specification.

Thus, the platform 110 enables the enterprise users to create customized and branded native mobile applications integrating selected plug-ins or widgets very fast, because the platform 110 provides a compositional, zero-programming approach to create the mobile application specification. For example, there may be provided drag-and-drop elements, customizable buttons, graphical or screen elements, and other features that can be used by non-professional developers in the creation of mobile application specifications. The platform 110 may also employ built-in templates that non-programmers may intuitively use to build native mobile applications and deploy them across all the popular client device platforms. In addition, professional programmers may take advantage of this approach to start building native mobile applications and seamlessly extend their functionalities by simply adding their custom coded components through the platform's plug-in or widget architecture.

Figure 2:
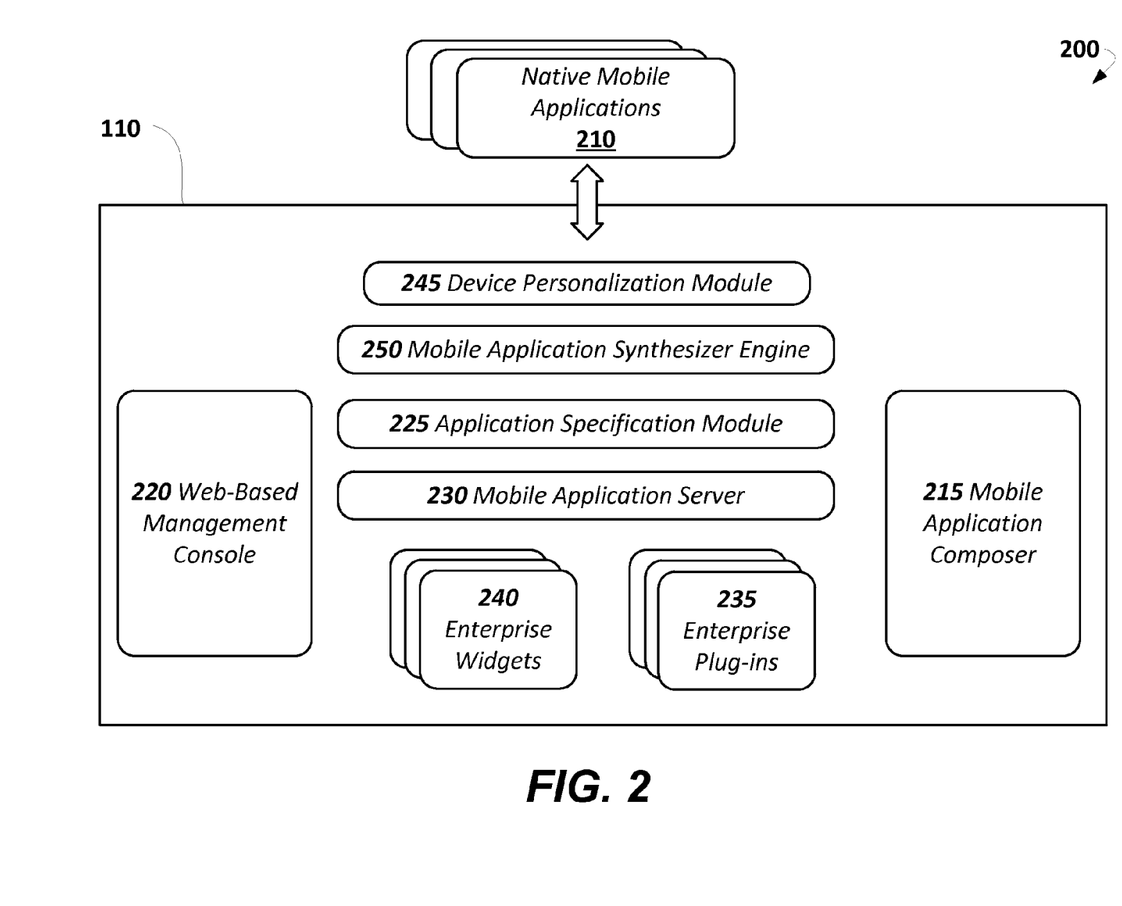
FIG. 2 is a high-level block diagram illustrating an example virtual environment suitable for implementing methods for rendering and operating native mobile applications.

FIG. 2 is a high-level block diagram illustrating an example virtual environment 200 suitable for implementing the methods for rendering and operating native mobile applications, according to one embodiment of the present disclosure. More specifically, there is shown interaction between native mobile applications 210 and elements and virtual modules of the platform 110. As shown in the figure, the platform 110 includes a mobile application composer 215 that can be used as a web console for enterprise users to create mobile application specifications, and design and specify their elements, lifecycle, workflow, integration, and so forth. Web-based management console 220 provides mobile application controls, content, user support, roles, policies, reporting, and push functionalities. Application specification module 225 maintains mobile application specifications as created by enterprise users including also plug-in specifications and widget specifications if integrated into the mobile application specifications. Further, mobile application server 230 may provide security to data transmission and processing (e.g., it provides secure containers), role-based access, search, metadata repository, and analytics with respect to the native mobile applications 210. Further, the platform 110 includes multiple enterprise plug-in components 235, which can be selected by enterprise users and built into native mobile applications. Some examples of enterprise plug-in components 235 include, but not limited to, Oracle® applications, Salesforce® applications, SAP® applications, Microsoft® Dynamics CRM applications, Webex® applications, Facebook® applications, and so forth. Additional examples of enterprise plug-in components 235 include, but are not limited to, Google Docs® application, Dropbox® application, Google® search application, Dripal® applications, PHP application, blogs, RSS feeds, Sharepoint® applications, Ducumentum® applications, Facebook® applications, Twitter® applications, Linkedin® applications, Email applications, Jive® applications, Lithium® applications, and so forth. Further, the platform 110 includes multiple enterprise widget components 240, which can be selected by enterprise users and built into native mobile applications. Some examples of enterprise widget components 240 include, but are not limited to, a sales kit, product/solution catalog, visual configurator, mobile content management system (CMS), product/solution advisor, questionnaires, engagement kit, forms kit, mobile webpages, assessment, survey wizard, multimedia gallery, trivia kit, sales guides, campaign manager, polls manager, device contacts, device camera, device maps, device location services, push notifications, click-to call/video call, click-to-email, instant messaging, clock-to-share, social media services, and so forth.

Still referencing to FIG. 2, there is also provided a device personalization module 245 for providing, personalizing, or enhancing specific functionalities to client devices 120 running native mobile applications 210 and to the platform 110. Some of these services include, but are not limited to, security, caching, offline services, location services using Global Positioning System (GPS) or similar system, camera, contacts, calendar, and so forth. The virtual environment 200 also includes a mobile application synthesizer engine 250 for onthe-fly construction of native mobile applications based upon mobile application specifications.

Notably, the modules 215-250 can be maintained in a single server of the platform 110 or can be distributed in accordance with the cloud computing approach. The interaction between these modules may include data transmission over a communications network using secure protocols or containers.

Figure 3:
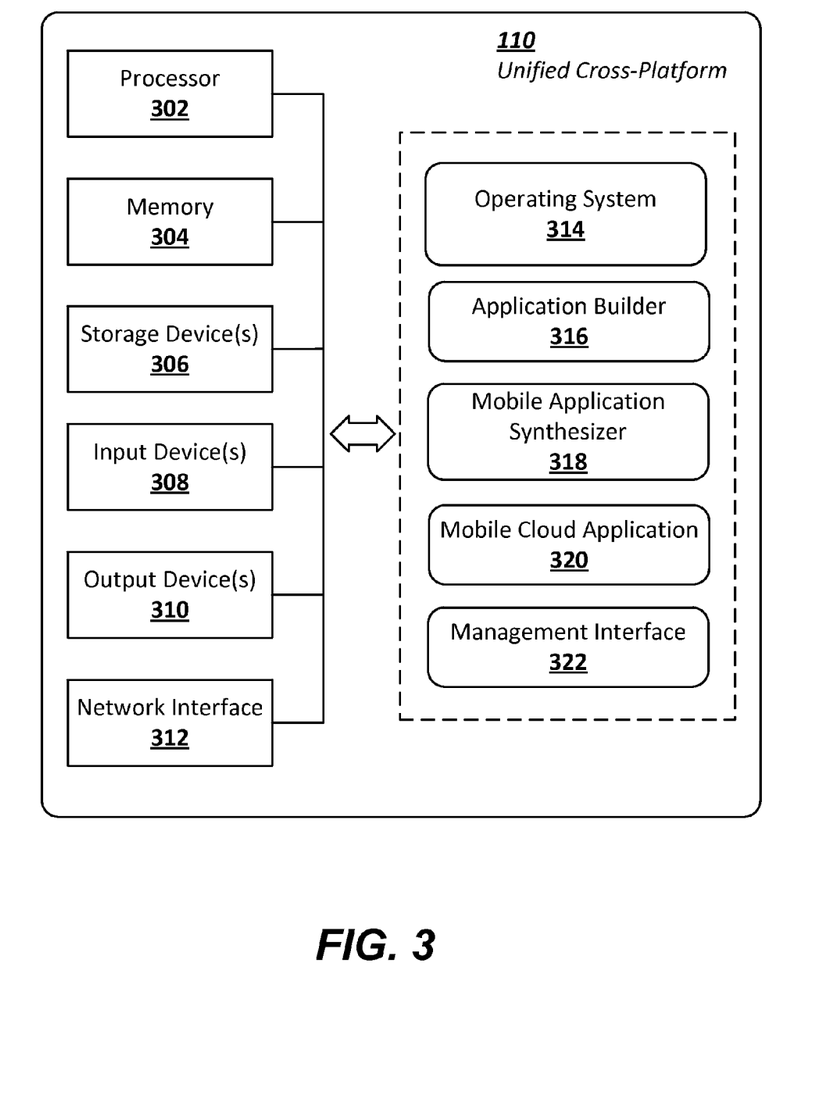
FIG. 3 is a high-level block diagram illustrating an example platform for rendering mobile applications.

FIG. 3 is a high-level block diagram illustrating an example platform 110 suitable for implementing the methods described herein. In particular, the platform 110 may be used for creating mobile application specifications, rendering native mobile applications based on the mobile application specifications, plug-in specifications, widget specifications, deploying the native mobile applications across multiple client devices 120, monitoring workflow and lifecycle of the native mobile applications, enterprise plug-in/widget components 160, enterprise resources or services, and so forth.

In general, the platform 110 may be, include, or be an integral part of one or more of a variety of types of devices and systems such as a general-purpose computer, desktop computer, server, computer network, network service, cloud computing service, and so forth. In some embodiments, the platform 110 has cloud-based implementation, which means it integrates multiple web servers and their services.

As shown in FIG. 3, the platform 110 includes one or more processors 302, a memory 304, one or more storage devices 306, one or more optional input devices 308, one or more optional output devices 310, and a network interface 312. One or more processors 302 are, in some examples, configured to implement functionality and/or process instructions for execution within the platform 110. For example, the processors 302 may process instructions stored in memory 304 and/or instructions stored on storage devices 306. Such instructions may include components of an operating system 314 or software applications 316-322. Platform 110 may also include one or more additional components not shown in FIG. 2, such as a housing, power supply, communication bus, and the like.

Memory 304, according to one example, is configured to store information within the platform 110 during operation. Memory 304, in some example embodiments, may refer to a non-transitory computer-readable storage medium or a computer-readable storage device. In some examples, memory 304 is a temporary memory, meaning that a primary purpose of memory 304 may not be long-term storage. Memory 304 may also refer to a volatile memory, meaning that memory 304 does not maintain stored contents when memory 304 is not receiving power. Examples of volatile memories include random access memories (RAM), dynamic random access memories (DRAM), static random access memories (SRAM), and other forms of volatile memories known in the art. In some examples, memory 304 is used to store program instructions for execution by the processors 302. Memory 304, in one example, is used by software (e.g., the operating system 314) or applications 316-322, such as a software, firmware or middleware for synthesis of native mobile applications, executing on platform 110 to temporarily store information during program execution. One or more storage devices 306 can also include one or more transitory or non-transitory computer-readable storage media and/or computer-readable storage devices. In some embodiments, storage devices 306 may be configured to store greater amounts of information than memory 304. Storage devices 306 may further be configured for long-term storage of information. In some examples, the storage devices 306 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 3, the platform 110 optionally includes one or more input devices 308. The input devices 308 are configured to receive input from users such as enterprise users. Examples of input devices 308 may include a keyboard, keypad, mouse, trackball, touchscreen, touchpad, or any other device capable of detecting an input from a user or other source, and relaying the input to platform 110, or components thereof. The optional output devices 310, in some examples, are configured to provide output to users through visual or auditory channels. Output devices 310 include a video graphics adapter card, liquid crystal display (LCD) monitor, light emitting diode (LED) monitor, sound card, a speaker, or any other device capable of generating output that may be intelligible to a user.

The platform 110, in some example embodiments, includes network interface 312. The network interface 312 can be utilized to communicate with external devices via one or more networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. The network interface 312 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB.

The operating system 314 may control one or more functionalities of platform 110 and/or components thereof. For example, the operating system 314 may interact with the applications 316-322, and may facilitate one or more interactions between applications 316-322 and one or more of processors 302, memory 304, storage devices 306, input devices 308, and output devices 310. As shown in FIG. 3, the operating system 314 may interact with or be otherwise coupled to the applications 316-322 and components thereof. In some embodiments, applications 316-322 may be included in operating system 314.

Still referencing to FIG. 3, the software applications 316-322 include an application builder 316, mobile application synthesizer 318, mobile cloud application service 320, and management interface 322. More particularly, the application builder 316 enables the enterprise users to create mobile application specifications in an easy manner, as well as select and integrate plug-ins and/or widget specifications. In some embodiments, the enterprise users use drag-and-drop functionality to specify mobile application elements, content, controls, rules, and interaction therebetween and with other web resources or services. The enterprise users may specify mobile application presentation, workflow, lifecycle, and integration.

The mobile application synthesizer 318 enables automatically compilation or construction of native mobile applications based on mobile application specifications created with the help of application builder 316, as well as enterprise plug-in specifications and/or enterprise widget specifications, which are associated with certain enterprise or public web resources or services 130-150. The mobile application synthesizer 318 creates multiple mobile applications for a variety of devices or OS platforms based on a single mobile application specification. The mobile application synthesizer 318 may also facilitate sending the native mobile applications to selected client devices 120, as well as their installation and deployment.

The mobile cloud application service 320 may provide a number of various web services such as security, role-based access, search, meta-data repository, analytics, cloud-enabled data store, and many more. This may be helpful not only for creation of the native mobile applications, but also for their operation on the client devices 120. The management interface 322 provides a great number of tools and mechanisms for control of native mobile applications, their deployment and usage; content control; poly management; reporting; and so forth. More specifically, the management interface 322 enables users to manage a workflow and lifecycle of multiple native mobile applications, track and monitor usage of multiple native mobile applications, manage mobile application specifications distributed over multiple servers, and so forth.

Figure 4:
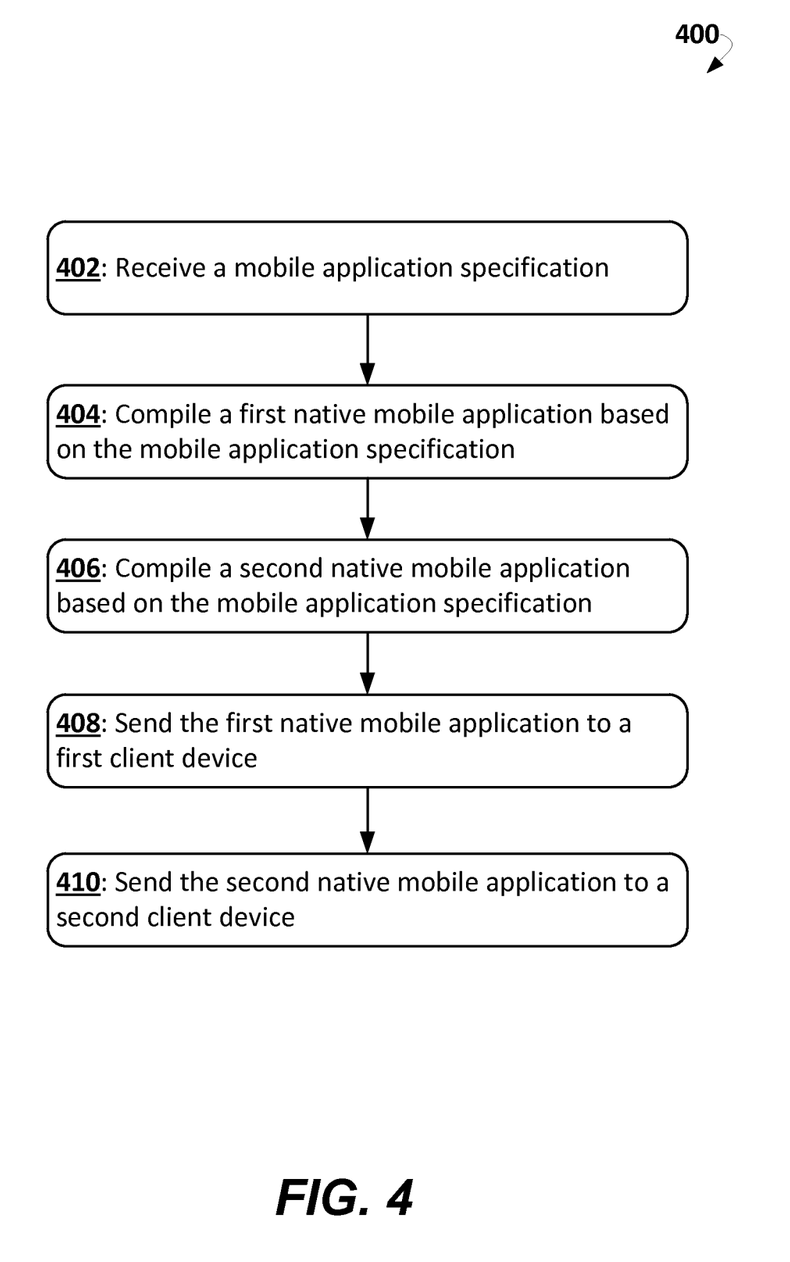
FIG. 4 shows a high-level process flow diagram of a method for rendering mobile applications.

FIG. 4 shows a high-level process flow diagram of a method 400 for rendering mobile applications, according to one exemplary embodiment. The method 400 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 400 is implemented by the platform 110 shown in FIGS. 1-3; however, it should be appreciated that the method 400 is just one example operation of the platform 110. In addition, the below recited steps of the method 400 may be implemented in an order different than described and shown in FIG. 4. Moreover, the method 400 may have additional steps not shown herein, but which can be evident for those skilled in the art from the present disclosure. The method 400 may also have fewer steps than outlined below and shown in FIG. 4.

The method 400 commences at step 402 with the platform 110 and more specifically with the mobile application synthesizer 318 receiving a mobile application specification as created by a user using the application builder 316. At step 404, the mobile application synthesizer 318 compiles or constructs a first native mobile application based on the mobile application specification. Similarly, at step 406, the mobile application synthesizer 318 compiles or constructs a second native mobile application based on the same mobile application specification. Notably, the mobile application synthesizer 318 can compile as many native mobile applications specific to certain hardware/OS platforms as needed.

At step 408, the mobile application synthesizer 318 sends the first native mobile application to a first client device 120, and at step 410 the mobile application synthesizer 318 sends the second native mobile application to a second client device 120 which is different from the first client device 120 and has a different OS and/or hardware than the first client device 120. These operations may be repeated as often as needed, and notably, the GUI and functionalities of the first and second native mobile applications substantially coincide with each other. In other words, every mobile application created by the mobile application synthesizer 318 based on one mobile application specification provides a unified GUI and substantially the same functionalities regardless of the hardware or OS platform of the client devices 120.

It is important to understand that a mobile application specification abstracts away native user interface components from native mobile applications using "screen" constructs, each of which is further filled with rules, instructions, and content to enable richness and control flow.

Below is shown a portion of exemplary mobile application specification given for illustration purposes:

```
<app name=" ... " revision="1.0">
  <data>
    <prop key="enterprise-backend ... "> Plug-in access
      credentials
  </prop>
  ...
  </data>
    <applet name="app1" imageurl=" ... " admin=" ... "
      acl="access-control-settings">
      <data>
        <prop key="Enterprise Service Name"> Plugin
          SvcURL
  </prop>
  ...
  </data>
  <intro type="web" url-" ... " ... />
  <screens type="grid" title=" ... " captions=" ... >
  <plug-in workflow>
  <plug-in-screens>
  </screens>
  </applet>
```

In the above example, the icons and URLs (uniform resource locators) represent cloud resources that can be synthesized directly into native mobile applications. Furthermore, the mobile application specification enables the native mobile application to automatically render its native user interface dynamically, upon startup, directly from this specification. In some embodiments, the mobile application specification also enables the native mobile applications to compose plug-ins and/or widgets and synthesize their native user interface dynamically, for example, upon startup, directly based upon the mobile application specification.

In some embodiments, the mobile application specification also includes application content and application instruction elements. The application content may either be internal or external (i.e., retrieved from public cloud or other web resources). Application instruction elements may include tags, application applets, plug-ins, widgets, GUI elements, and so forth.

The applets represented in the mobile application specification may "modularize" different aspects of enterprise resources/services being integrated, solutions to be sold, or distinct workflow activities such as "product selling," "account management," "expense reporting," "visualization," and so forth. In some embodiments, the applets represent workflow activities that a client device user of the different backend systems 130-150 would engage in. For example, a sales person may start unified collaboration to engage a customer, get customer info using SalesForce®, then do a product presentation from an enterprise CMS followed by a Configure-Price-Quote (CPQ) from SAP® or Siebel® or other backend system, and finally upload an order into an ordering system, all from a single enterprise mobile application. In other embodiments, the applets represent distinct starting points of the mobile application graphical user interface, where different users could invoke the mobile application with different starting points.

Referring back to the mobile application specification example shown above, there are a number of "screen" elements. These elements represent an initial user interface to be shown to the users of client devices 120. In the example above, the "screen" elements specify a "grid" layout consisting of multiple actionable "buttons" each represented as a "screen" element. The "data" section, as shown in the example above, represents enterprise services such as "enterprise communities," "Knowledge bases," and "CRM/SFA systems" for which the integration plug-ins and authentication credentials may reside on one or more cloud services.

Figure 5:
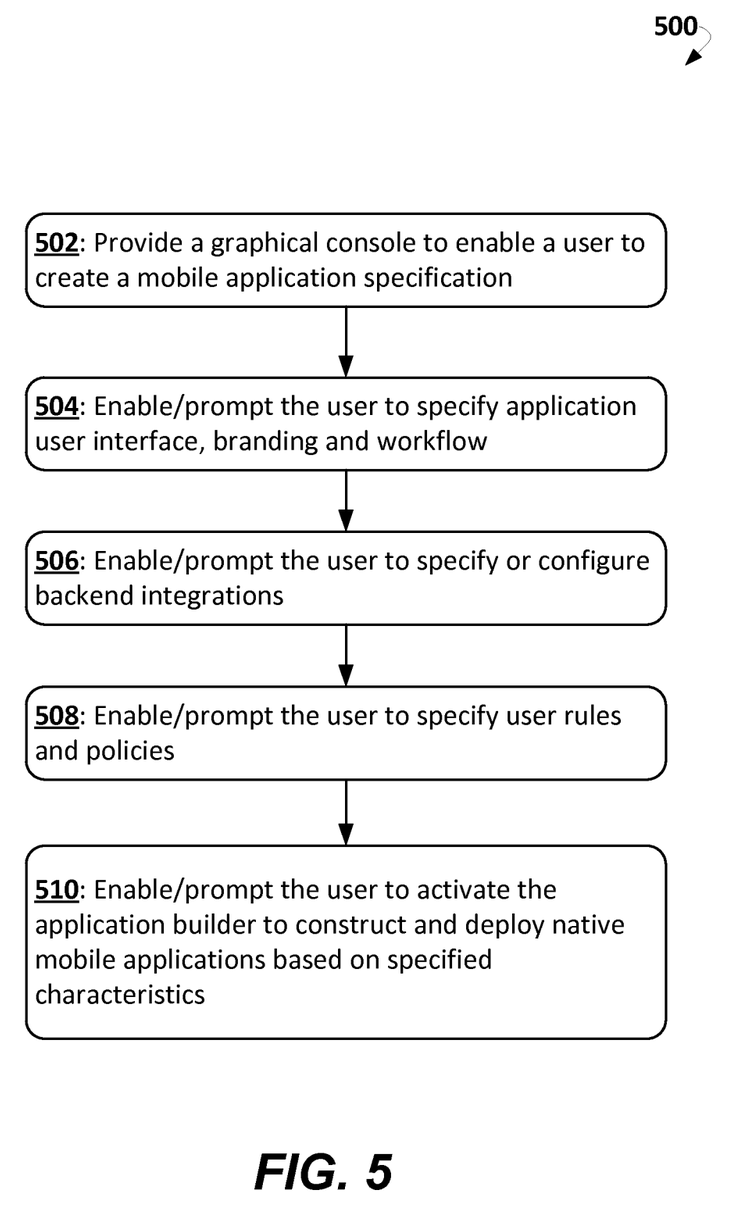
FIG. 5 shows a high-level process flow diagram of a method for creating a mobile application specification.

FIG. 5 shows a high-level process flow diagram of a method 500 for creating a mobile application specification, according to one exemplary embodiment. The method 500 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 500 is implemented by the platform 110 shown in FIGS. 1-3; however, it should be appreciated that the method 500 is just one example operation of the platform 110. In addition, the below recited steps of the method 500 may be implemented in an order different than described and shown in FIG. 5. Moreover, the method 500 may have additional steps not shown herein, but which can be evident for those skilled in the art from the present disclosure. The method 500 may also have fewer steps than outlined below and shown in FIG. 5.

The method 500 commences at step 502 with the application builder 316 of the platform 110 providing a graphical console for an enterprise user to create a mobile application specification. At step 504, the application builder 316 enables or prompts the enterprise user to specify an application user interface, branding, and workflow in association with the mobile application specification. At step 506, the application builder 316 enables or prompts the enterprise user to specify or configure backend integrations in association with the mobile application specification. At step 508, the application builder 316 enables or prompts the user to specify user policies and roles in association with the mobile application specification. At step 510, the application builder 316 enables or prompts the user to activate the mobile application synthesizer 318 to automatically construct and deploy native mobile applications based on the mobile application specification.

Figure 6:
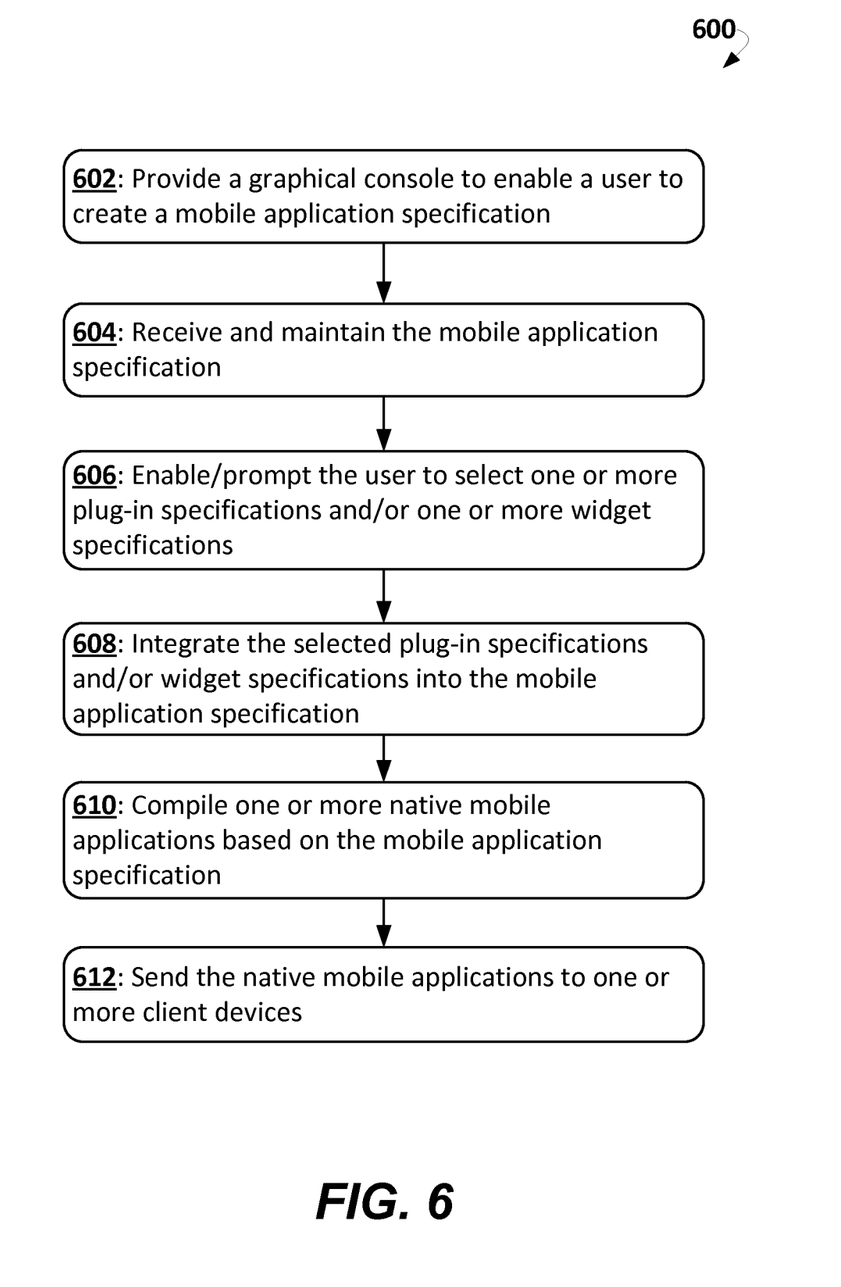
FIG. 6 shows a high-level process flow diagram of yet another method for rendering a mobile application specification.

FIG. 6 shows a high-level process flow diagram of a method 600 for rendering a mobile application specification, according to one exemplary embodiment. The method 600 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 600 is implemented by the platform 110 shown in FIGS. 1-3; however, it should be appreciated that the method 600 is just one example operation of the platform 110. In addition, the below recited steps of the method 600 may be implemented in an order different than described and shown in FIG. 6. Moreover, the method 600 may have additional steps not shown herein, but which can be evident for those skilled in the art from the present disclosure. The method 600 may also have fewer steps than outlined below and shown in FIG. 6.

The method 600 commences at step 602 with the application builder 316 of the platform 110 providing a graphical console for an enterprise user to create a mobile application specification. At step 604, the mobile application synthesizer 318 receives and maintains the mobile application specification as created by the enterprise user using the application builder 316. At step 606, the application builder 316 enables the enterprise users to select one or more plug-in specifications and/or one or more widget specifications. At step 608, the mobile application synthesizer 318 integrates the selected plug-in specifications and/or widget specifications into the mobile application specification. At step 610, the mobile application synthesizer 318 compiles or constructs one or more native mobile applications based on the mobile application specification updated at the step 606. At step 612, the mobile application synthesizer 318 sends the native mobile applications to client devices 120.

Thus, systems and methods for rendering native mobile applications have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for rendering native mobile applications on a computing device such that the computing device can read or address the mobile applications and plug-in/widget specifications at run time and provide corresponding graphical user interfaces and workflows, the method comprising:

maintaining, by the computing device comprising one or more processors and a memory, a mobile application specification, a plurality of plug-in specifications, each of the plug-in specifications being associated with at least one first enterprise backend resource or enterprise service, and a plurality of widget specifications, each of the widget specifications being associated with at least one second enterprise backend resource or enterprise service, in which at least one of the widget specifications or at least one of the plug-in specifications enables bi-directional data transmission between one or more native mobile applications and at least one of the at least one first enterprise backend resource or enterprise service and the at least one second enterprise backend resource or enterprise service;

selectively integrating, by the computing device, at least one of the plug-in specifications or at least one of the widget specifications into the mobile application specification;

compiling, by the computing device, the one or more native mobile applications based at least in part on the mobile application specification; and sending, by the computing device, the one or more native mobile applications to one or more client devices.

2. The method of claim 1, further comprising enabling an enterprise user, by the computing device and a web interface console, to select at least one of the plug-in specifications to integrate into the mobile specification.

3. The method of claim 1, further comprising enabling an enterprise user, by the computing device and a web interface console, to select at least one of the widget specifications to integrate into the mobile specification.

4. The method of claim 1, wherein the one or more native mobile applications are independent of an operating system of the one or more client devices.

5. The method of claim 1, wherein the compiling of the one or more native mobile applications comprises:

compiling, by the computing device, a first native mobile application based at least in part on the mobile application specification; and compiling, by the computing device, a second native mobile application based at least in part on the mobile application specification, wherein the second native mobile application differs from the first native mobile application.

6. The method of claim 5, wherein the sending of the one or more native mobile applications to the one or more client devices comprises:
sending, by the computing device, the first native mobile application to a first client device, wherein the first native mobile application is specific to an operating system or hardware of the first client device, and the first native mobile application is capable of being executed by the first client device; and
sending, by the computing device, the second native mobile application to a second client device, wherein the second native mobile application is specific to an operating system or hardware of the second client device and the second native mobile application is capable of being executed by the second client device; and
wherein the first client device comprises a first operational software platform, the second client device comprises a second operational software platform, and the first operational software platform is different from the second operational software platform.

7. The method of claim 6, wherein the first native mobile application is configured to provide a unified graphical user interface (GUI) for displaying by the first client device, and the second native mobile application is configured to provide the unified GUI for displaying by the second client device.

8. The method of claim 1, further comprising providing, by the computing device and via a web interface console, a management interface for enterprise users.

9. The method of claim 8, wherein the management interface is configured to enable the enterprise users to manage a workflow associated with the one or more native mobile applications.

10. The method of claim 8, wherein the management interface is configured to enable the enterprise users to manage a lifecycle of the one or more native mobile applications.

11. The method of claim 8, wherein the management interface is configured to track and monitor usage of the one or more native mobile applications.

12. The method of claim 8, wherein the management interface is configured to track and monitor usage of at least one the following: the at least one first enterprise backend resource or enterprise service and the at least one second enterprise backend resource or enterprise service.

13. The method of claim 8, wherein the management interface is configured to track and monitor usage of at least one the following: an enterprise backend plug-in component maintained by the computing device and an enterprise backend widget component maintained by the computing device.

14. The method of claim 1, further comprising providing a web interface console by the computing device, and enabling one or more enterprise users to create the mobile application specification.

15. A system for rendering native mobile applications on one or more client devices such that the one or more client devices can read or address the mobile applications and plug-in/widget specifications at run time and provide corresponding graphical user interfaces and workflows, the system comprising:
a server being in communication with the one or more client devices, one or more enterprise backend resources and one or more enterprise backend services;
wherein the server comprises one or more processors and a memory, the memory maintaining a mobile application specification, one or more plug-in specifications, and one or more widget specifications, wherein each of the plug-in specifications is associated with at least one first enterprise backend resource or enterprise service, and each of the widget specifications is associated with at least one second enterprise backend resource or enterprise service, in which at least one of the widget specifications or at least one of the plug-in specifications enables bi-directional data transmission between one or more native mobile applications and at least one of the at least one first enterprise backend resource or enterprise service and the at least one second enterprise backend resource or enterprise service;
wherein the one or more processors are configured to:
selectively integrate at least one of the plug-in specifications or at least one of the widget specifications into the mobile application specification;
compile the one or more native mobile applications based at least in part on the mobile application specification; and
send the one or more native mobile applications to the one or more client devices.

16. The system of claim 15, further comprising a web interface console configured to enable one or more enterprise users to create the mobile application specification.

17. The system of claim 15, further comprising a management interface configured to enable enterprise users to manage a workflow and a lifecycle of the one or more native mobile applications.

18. A non-transitory processor-readable medium having instructions stored thereon, which when executed by one or more processors, cause the one or more processors to implement a method for rendering native mobile applications on one or more client devices such that the one or more client devices can read or address the mobile applications and plug-in/widget specifications at run time and provide corresponding graphical user interfaces and workflows, the method comprising:
maintaining a mobile application specification;
maintaining a plurality of plug-in specifications, wherein each of the plug-in specifications is associated with at least one first enterprise backend resource or enterprise service;
maintaining a plurality of widget specifications, wherein each of the widget specifications is associated with at least one second enterprise backend resource or enterprise service;
selectively integrating at least one of the plug-in specifications or at least one of the widget specifications into the mobile application specification, in which at least one of the widget specifications or at least one of the plug-in specifications enables bi-directional data transmission between one or more native mobile applications and at least one of the at least one first enterprise backend resource or enterprise service and the at least one second enterprise backend resource or enterprise service;
compiling the one or more native mobile applications based at least in part on the mobile application specification; and
sending the one or more native mobile applications to the one or more client devices.

* * * * *